US010823067B2

(12) United States Patent
Sennoun et al.

(10) Patent No.: US 10,823,067 B2
(45) Date of Patent: Nov. 3, 2020

(54) SYSTEM FOR A SURFACE COOLER WITH OGV ORIENTED FIN ANGLES

(71) Applicant: GENERAL ELECTRIC COMPANY, Schenectady, NY (US)

(72) Inventors: Mohammed El Hacin Sennoun, West Chester, OH (US); William Joseph Solomon, Montgomery, OH (US); Kyle Louis Miller, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 845 days.

(21) Appl. No.: 15/152,202

(22) Filed: May 11, 2016

(65) Prior Publication Data

US 2017/0328279 A1 Nov. 16, 2017

(51) Int. Cl.
*F02C 7/14* (2006.01)
*F01D 9/04* (2006.01)
*F28D 1/02* (2006.01)

(52) U.S. Cl.
CPC ............... *F02C 7/14* (2013.01); *F01D 9/041* (2013.01); *F28D 1/024* (2013.01); *F05D 2260/213* (2013.01); *F05D 2260/22141* (2013.01)

(58) Field of Classification Search
CPC ...... F02C 7/12; F02C 7/14; F02C 7/18; F02C 7/185; F02C 9/18; F28F 3/04; F01D 25/12; F01D 5/185; F01D 5/186; F01D 5/187
USPC ...................... 60/785, 39, 83, 730
See application file for complete search history.

(56) References Cited

U.S. PATENT DOCUMENTS

| 6,336,326 B1 | 1/2002 | Conrad |
| 7,572,103 B2 | 8/2009 | Walters et al. |
| 8,312,729 B2 | 11/2012 | Matwey et al. |
| 8,601,791 B2 | 12/2013 | Bajusz et al. |
| 2003/0111215 A1 | 6/2003 | Walther et al. |
| 2009/0165995 A1 | 7/2009 | Bajusz et al. |
| 2013/0239578 A1 | 9/2013 | Saban et al. |
| 2014/0027102 A1* | 1/2014 | Antel, Jr. ............... B23P 15/26 165/185 |

(Continued)

FOREIGN PATENT DOCUMENTS

| CA | 2 911 757 A1 | 5/2016 |
| EP | 1 916 399 A2 | 4/2008 |

(Continued)

OTHER PUBLICATIONS

International Search Report and Written Opinion issued in connection with corresponding PCT Application No. PCT/US2017/026801 dated Feb. 1, 2018.

*Primary Examiner* — Jesse S Bogue
*Assistant Examiner* — Loren C Edwards
(74) *Attorney, Agent, or Firm* — Dority & Manning, P.A.

(57) ABSTRACT

The heat exchanger assembly includes a first conduit, an external surface, and a set of fins. The first conduit includes a first inlet, a first outlet, and a first internal flow path extending between the first inlet and first outlet. The first conduit is configured to channel a flow of fluid to be cooled from the first inlet to the first outlet. The external surface which includes a plurality of regions. Each region of the plurality of regions includes a respective set of fins extending from the external surface. Each set of fins of a respective region of the plurality of regions are oriented in a different direction than sets of fins of other regions of the plurality of regions.

12 Claims, 7 Drawing Sheets

(56) References Cited

U.S. PATENT DOCUMENTS

2015/0240722 A1    8/2015    Loebig et al.

FOREIGN PATENT DOCUMENTS

| EP | 2 011 988 A2 | 1/2009 |
| EP | 2 339 144 A2 | 6/2011 |
| EP | 2 894 323 A1 | 7/2015 |
| GB | 2 389 174 A | 12/2003 |
| WO | 2016/063497 A1 | 4/2016 |

* cited by examiner

SYSTEM FOR A SURFACE COOLER WITH OGV ORIENTED FIN ANGLES

BACKGROUND

The field of the disclosure relates generally to gas turbine engines and, more particularly, to a method and system for surface coolers in a gas turbine engine.

At least some known gas turbine engines include one or more oil cooling systems that are configured to cool and lubricate components of gas turbine engines. Some gas turbine engines include an air-oil surface cooler heat exchanger attached to the inner radial surface of the nacelle or the outer radial surface of the gas turbine engine that use fan air to cool the oil flowing through the air-oil heat exchanger. Air-oil surface coolers include fins protruding into the bypass airflow passageway that exchange heat with the relatively cold fan air. The fins cause friction losses to the air flowing through the bypass airflow passageway which reduces the fuel efficiency of the engine.

BRIEF DESCRIPTION

In one aspect, a heat exchanger assembly is provided. The heat exchanger assembly includes a first conduit, an external surface, and a set of fins. The first conduit includes a first inlet, a first outlet, and a first internal flow path extending between the first inlet and first outlet. The first conduit is configured to channel a flow of fluid to be cooled from the first inlet to the first outlet. The external surface includes a plurality of regions. Each region of the plurality of regions includes a respective set of fins extending from the external surface. Each set of fins of a respective region of the plurality of regions are oriented in a different direction than sets of fins of other regions of the plurality of regions.

In another aspect, a gas turbine engine is provided. The gas turbine engine includes a core engine, a bypass duct, a plurality of airfoil members, and a heat exchanger assembly. The bypass duct at least partially surrounds the core engine. The plurality of airfoil members extend between the bypass duct and the core engine. The core engine includes the heat exchanger assembly which includes a first conduit, an external surface, and a set of fins. The first conduit includes a first inlet, a first outlet, and a first internal flow path extending between the first inlet and first outlet. The first conduit is configured to channel a flow of fluid to be cooled from the first inlet to the first outlet. The external surface includes a plurality of regions. Each region of the plurality of regions includes a respective set of fins extending from the external surface. Each set of fins of a respective region of the plurality of regions are oriented in a different direction than sets of fins of other regions of the plurality of regions.

In yet another aspect, an aircraft is provided. The aircraft includes a fuselage, a wind, and a gas turbine engine assembly. The fuselage includes a nose, a tail, and a hollow, elongate body extending therebetween. The wing extends laterally away from the fuselage. The gas turbine engine assembly is configured to drive a bladed rotatable member and is coupled to at least one of the wing or the fuselage. The gas turbine engine assembly includes a core engine, a bypass duct, a plurality of airfoil members, and a heat exchanger assembly. The bypass duct at least partially surrounds the core engine. The plurality of airfoil members extend between the bypass duct and the core engine. The core engine includes the heat exchanger assembly which includes a first conduit, an external surface, and a set of fins. The first conduit includes a first inlet, a first outlet, and a first internal flow path extending between the first inlet and first outlet. The first conduit is configured to channel a flow of fluid to be cooled from the first inlet to the first outlet. The external surface includes a plurality of regions. Each region of the plurality of regions includes a respective set of fins extending from the external surface. Each set of fins of a respective region of the plurality of regions are oriented in a different direction than sets of fins of other regions of the plurality of regions.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1-7 show example embodiments of the method and apparatus described herein.

FIG. 1 is a perspective view of an aircraft.

FIG. 2 is a schematic cross-sectional view of a gas turbine engine in accordance with an exemplary embodiment of the present disclosure that may be used with the aircraft shown in FIG. 1.

FIG. 4 is a perspective view of a surface cooler disposed on an inner radial surface of nacelle.

FIG. 5 is a perspective view of another surface cooler disposed on inner radial surface of nacelle.

FIG. 6 is a perspective view of another surface cooler disposed on inner radial surface of nacelle.

FIG. 7 is a perspective view of another surface cooler disposed on inner radial surface of nacelle.

Figure 1:
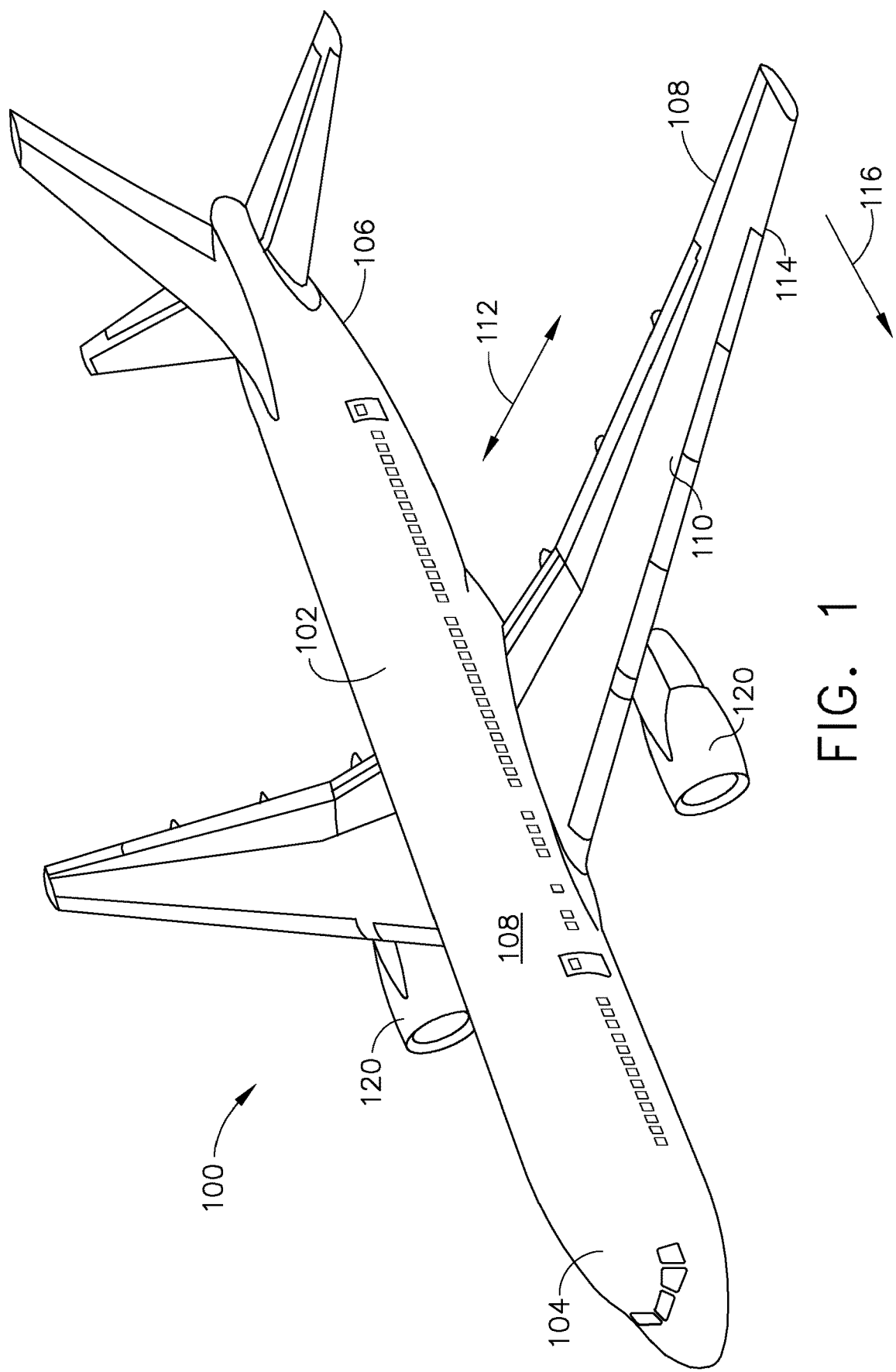

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following detailed description illustrates embodiments of the disclosure by way of example and not by way of limitation. It is contemplated that the disclosure has general application to a system for cooling oil in an aircraft engine.

Embodiments of the heat exchanger assembly described herein cool oil in a gas turbine engine assembly. A nacelle at least partially surrounding the gas turbine engine forms a fan bypass duct therebetween. The heat exchanger assembly includes an air-oil heat exchanger located on an inner radial surface of the nacelle or on an outer radial surface of the gas turbine engine exposed to air flowing in the fan bypass duct. The air-oil heat exchanger includes a first flow path for channeling oil through the heat exchanger internal passages and an external surface for directing air proximate to fins on the external surface. The fins disposed on the external surface of the heat exchanger protrude into the fan bypass duct. The heat exchanger cools the oil by exchanging heat in the oil flowing through the first flow path with fan air in the fan bypass duct. Additionally, outlet guide vanes extending between the nacelle and the gas turbine engine direct the flow of air through the nacelle. The oil flows through the first flow path and the air flows proximate the fins on the external surface. The fins on the external surface of the heat exchanger are aligned in approximately the same direction as the outlet guide vanes to facilitate channeling air flow through the fan bypass duct efficiently to minimize fan air pressure losses.

The heat exchanger assemblies described herein offer advantages over known methods of cooling oil in a gas turbine engine. More specifically, some known heat exchangers orient the fins on the surface of the heat exchanger in one direction regardless of the direction the outlet guide vanes are directing air flow. The fins on the external surface of the heat exchangers described herein direct air flow in the same direction as the outlet guide vanes reducing pressure loss and drag thereby increasing the fuel efficiency of the gas turbine engine.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one engine 120 configured to drive a bladed rotatable member or fan to generate thrust. Engine 120 is coupled to at least one of wing 110 and fuselage 102, for example, in a pusher configuration (not shown) proximate tail 106.

Figure 2:
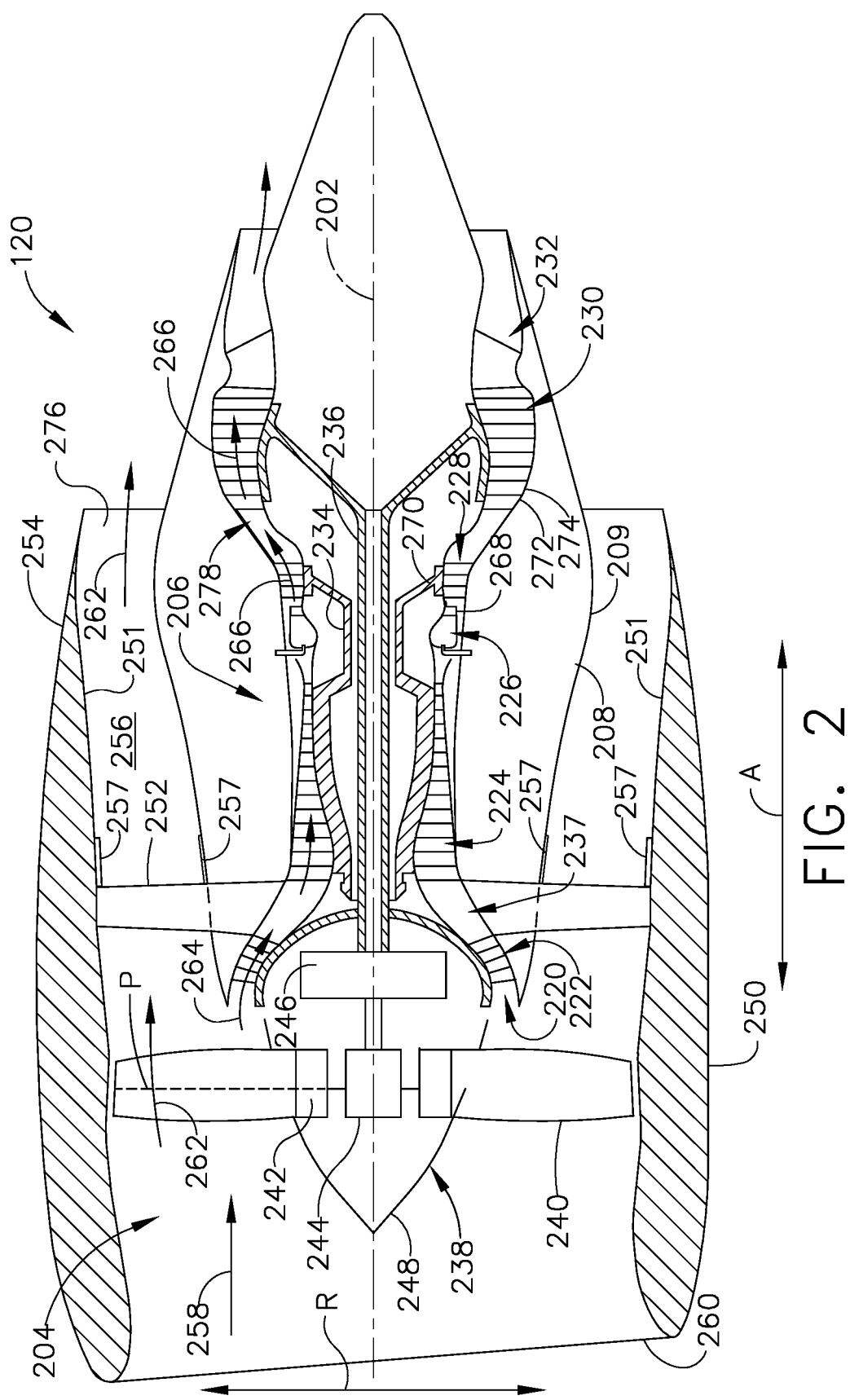

FIG. 2 is a schematic cross-sectional view of gas turbine engine 120 in accordance with an exemplary embodiment of the present disclosure. In the example embodiment, gas turbine engine 120 is embodied in a high bypass turbofan jet engine. As shown in FIG. 2, turbofan engine 120 defines an axial direction A (extending parallel to a longitudinal axis 202 provided for reference) and a radial direction R. In general, turbofan 120 includes a fan assembly 204 and a core turbine engine 206 disposed downstream from fan assembly 204.

In the example embodiment, core turbine engine 206 includes an approximately tubular outer casing 208 that defines an annular inlet 220. Outer casing 208 encases, in serial flow relationship, a compressor section including a booster or low pressure (LP) compressor 222 and a high pressure (HP) compressor 224; a combustion section 226; a turbine section including a high pressure (HP) turbine 228 and a low pressure (LP) turbine 230; and a jet exhaust nozzle section 232. Out casing 208 also includes an outer radial surface 209. A high pressure (HP) shaft or spool 234 drivingly connects HP turbine 228 to HP compressor 224. A low pressure (LP) shaft or spool 236 drivingly connects LP turbine 230 to LP compressor 222. The compressor section, combustion section 226, turbine section, and nozzle section 232 together define a core air flowpath 237.

In the example embodiment, fan assembly 204 includes a variable pitch fan 238 having a plurality of fan blades 240 coupled to a disk 242 in a spaced apart relationship. Although fan assembly 204 is described as including a variable pitch fan 238, fan assembly 204 could include a conventional fixed pitch fan. Fan blades 240 extend radially outwardly from disk 242. Each fan blade 240 is rotatable relative to disk 242 about a pitch axis P by virtue of fan blades 240 being operatively coupled to a suitable pitch change mechanism (PCM) 244 configured to vary the pitch of fan blades 240. In other embodiments, PCM 244 is configured to collectively vary the pitch of fan blades 240 in unison. Fan blades 240, disk 242, PCM 244, and LP compressor 222 are together rotatable about longitudinal axis 202 by LP shaft 236 across a power gear box 246.

Disk 242 is covered by rotatable front hub 248 aerodynamically contoured to promote an airflow through the plurality of fan blades 240. Additionally, fan assembly 204 includes an annular fan casing or outer nacelle 250 that circumferentially surrounds fan 238 and/or at least a portion of core turbine engine 206. Nacelle 250 includes an inner radial surface 251. In the example embodiment, nacelle 250 is configured to be supported relative to core turbine engine 206 by a plurality of circumferentially-spaced outlet guide vanes 252. Moreover, a downstream section 254 of nacelle 250 may extend over an outer portion of core turbine engine 206 so as to define a bypass airflow passage 256 therebetween. A plurality of surface coolers 257 is disposed on inner radial surface 251 of nacelle 250 in bypass airflow passage 256 aft of outlet guide vanes 252. In an alternative embodiment, surface coolers 257 are disposed on outer casing 208 aft of outlet guide vanes 252. In the exemplary embodiment, surface coolers 257 are disposed on inner or outer radial surface 251 of nacelle 250 in bypass airflow passage 256 aft of outlet guide vanes 252 less than 2 inches from the trailing edge of outlet guide vanes 252. However, surface coolers 257 may be disposed on inner or outer radial surfaces 251 of nacelle 250 in bypass airflow passage 256 at any location that enables surface coolers 257 to operate a described herein. Surface coolers 257 are configured to channel a flow of fluid through internal conduits to cool the fluid with airflow in the bypass airflow passage 256. In exemplary embodiment, the fluid cooled by surface coolers 257 is oil. However, in alternative embodiments, surface coolers 257 may be configured to cool fuel or any other suitable fluid.

During operation of turbofan engine 120, a volume of air 258 enters turbofan 120 through an associated inlet 260 of nacelle 250 and/or fan assembly 204. As volume of air 258 passes across fan blades 240, a first portion 262 of volume of air 258 is directed or routed into bypass airflow passage 256 and a second portion 264 of volume of air 258 is directed or routed into core air flowpath 237, or more specifically into LP compressor 222. First portion of air 262 flows proximate to a surface of surface coolers 257 and cools oil within surface coolers 257. A ratio between first portion 262 and second portion 264 is commonly referred to as a bypass ratio. The pressure of second portion 264 is then increased as it is routed through HP compressor 224 and into combustion section 226, where it is mixed with fuel and burned to provide combustion gases 266.

Combustion gases 266 are routed through HP turbine 228 where a portion of thermal and/or kinetic energy from combustion gases 266 is extracted via sequential stages of HP turbine stator vanes 268 that are coupled to outer casing 208 and HP turbine rotor blades 270 that are coupled to HP shaft or spool 234, thus causing HP shaft or spool 234 to rotate, which then drives a rotation of HP compressor 224. Combustion gases 266 are then routed through LP turbine 230 where a second portion of thermal and kinetic energy is extracted from combustion gases 266 via sequential stages of LP turbine stator vanes 272 that are coupled to outer casing 208 and LP turbine rotor blades 274 that are coupled to LP shaft or spool 236, which drives a rotation of LP shaft or spool 236, LP compressor 222, and rotation of fan 238 across power gear box 246.

Combustion gases 266 are subsequently routed through jet exhaust nozzle section 232 of core turbine engine 206 to provide propulsive thrust. Simultaneously, the pressure of first portion 262 is substantially increased as first portion 262 is routed through bypass airflow passage 256 before it is exhausted from a fan nozzle exhaust section 276 of turbofan 120, also providing propulsive thrust. HP turbine 228, LP turbine 230, and jet exhaust nozzle section 232 at least partially define a hot gas path 278 for routing combustion gases 266 through core turbine engine 206.

Exemplary turbofan engine 120 depicted in FIG. 2 is by way of example only, and in other embodiments, turbofan engine 120 may have any other suitable configuration. It should also be appreciated, that in still other embodiments, aspects of the present disclosure may be incorporated into any other suitable gas turbine engine. For example, in other embodiments, aspects of the present disclosure may be incorporated into, e.g., a turboprop engine. In other embodiments, turbofan engine 120 may be an unducted fan engine with surface coolers 257 disposed on outer casing 208.

Figures 3A, 3B:
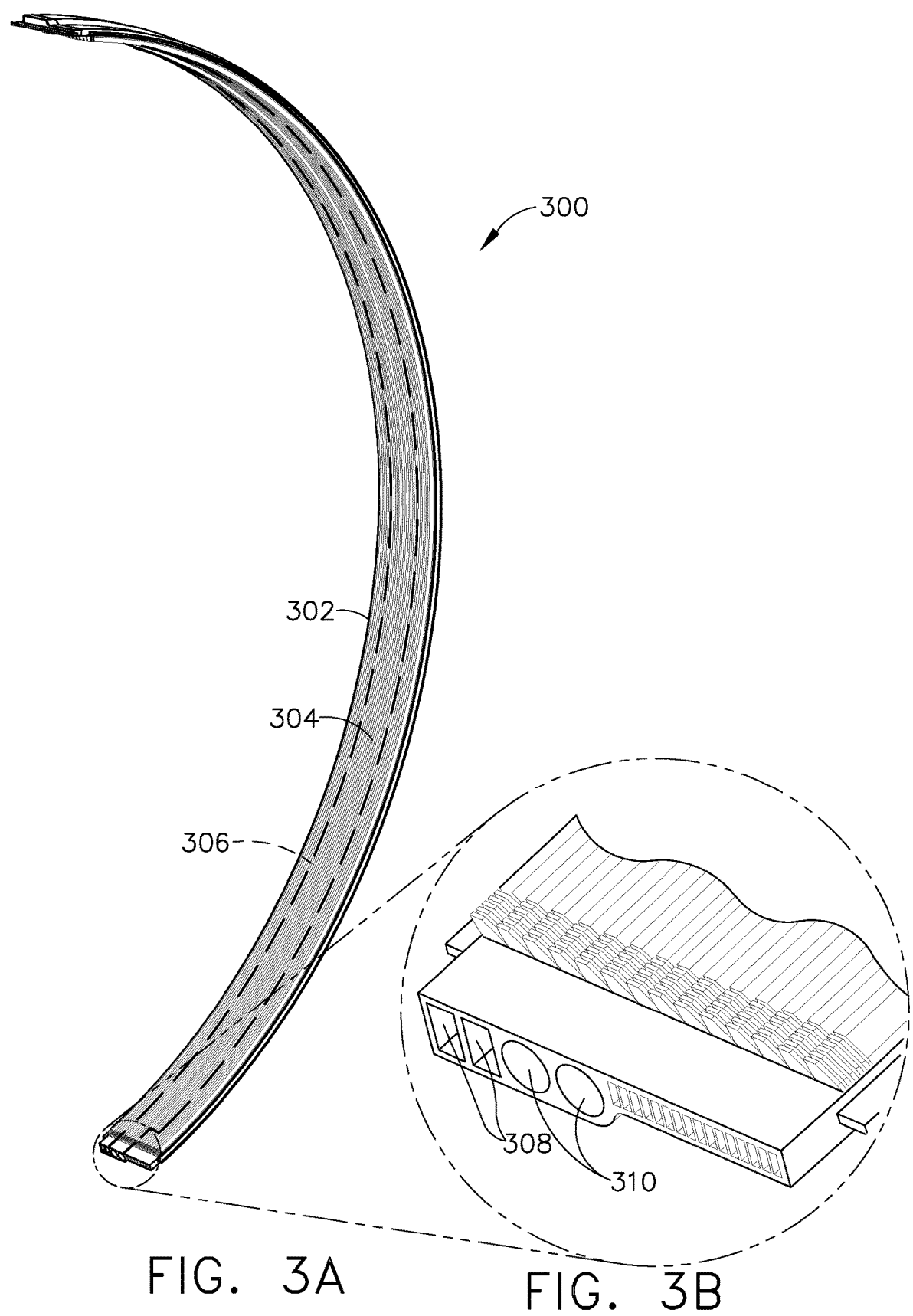
FIG. 3A is a schematic diagram of a surface cooler.
FIG. 3B is a schematic diagram of a surface cooler inlet and outlet.

FIG. 3A is a schematic diagram of a surface cooler 300. FIG. 3B is a schematic diagram of a surface cooler 300 inlet and outlet. Surface cooler 300 includes a surface 302 disposed on inner radial surface 251 (shown in FIG. 2) of nacelle 250 (shown in FIG. 2). In an alternative embodiment, surface cooler 300 includes a surface 302 disposed on outer radial surface 209 (shown in FIG. 2) of outer casing 208 (shown in FIG. 2). Surface cooler 300 also includes a plurality of fin members 304 disposed on surface 302 and extending into bypass airflow passage 256 (shown in FIG. 2). Surface cooler 300 includes a surface cooler inlet 308, a surface cooler outlet 310, and one or more internal flow paths 306 extending therebetween.

During operation, first portion of air 262 (shown in FIG. 2) in bypass airflow passage 256 (shown in FIG. 2) is configured to flow proximate to surface 302 to exchange heat with fin members 304. Surface cooler inlet 308 is configured to receive a flow of oil to be cooled and channel oil to internal flow paths 306. Oil in internal flow paths 306 is configured to exchange heat with first portion of air 262 (shown in FIG. 2) through fin members 304. Internal flow paths 306 are configured to channel oil to surface cooler outlet 310 which is configured to return oil to core turbine engine 206 (shown in FIG. 2).

Figure 4:
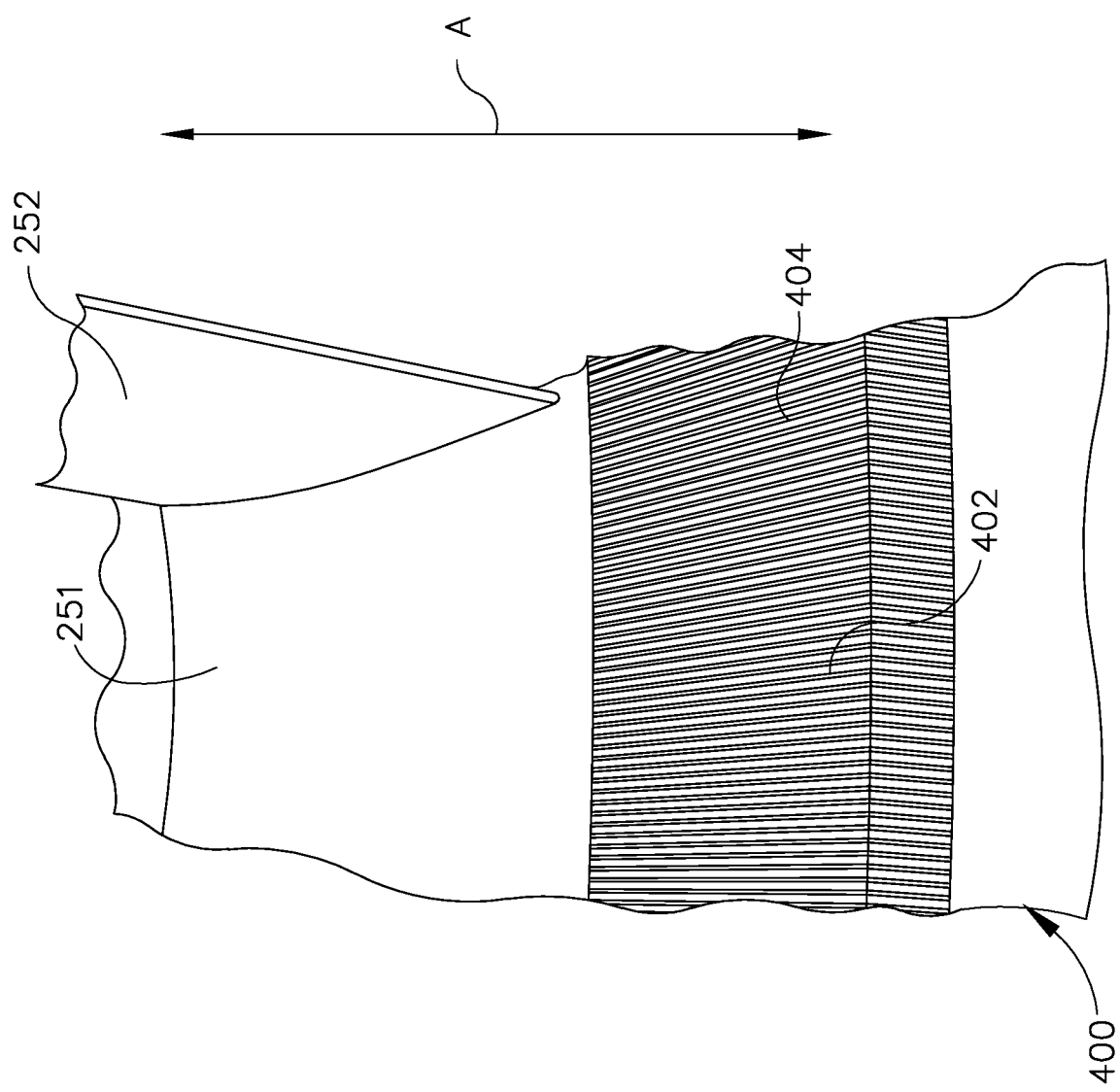
Figure 5:
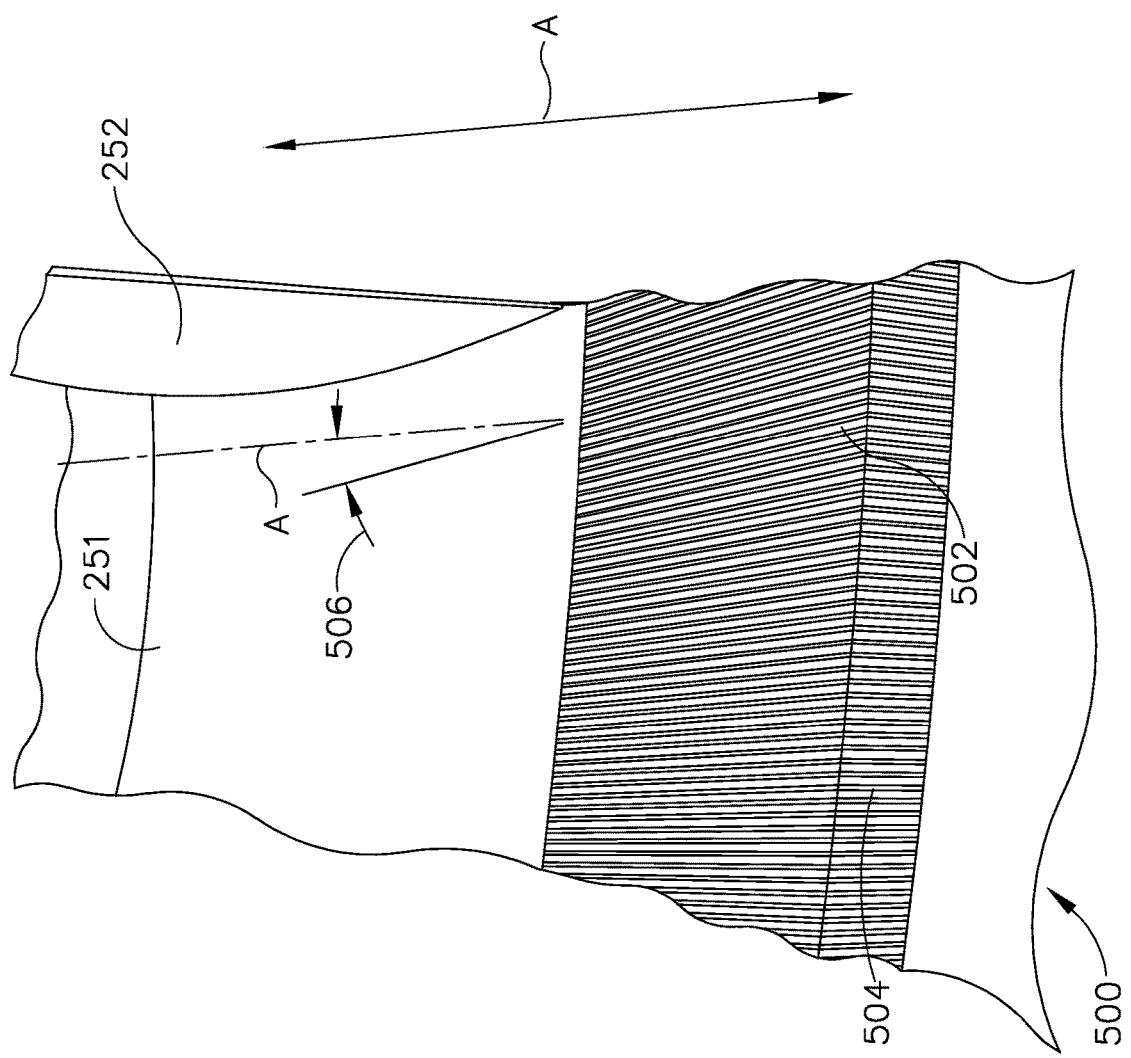
Figure 6:
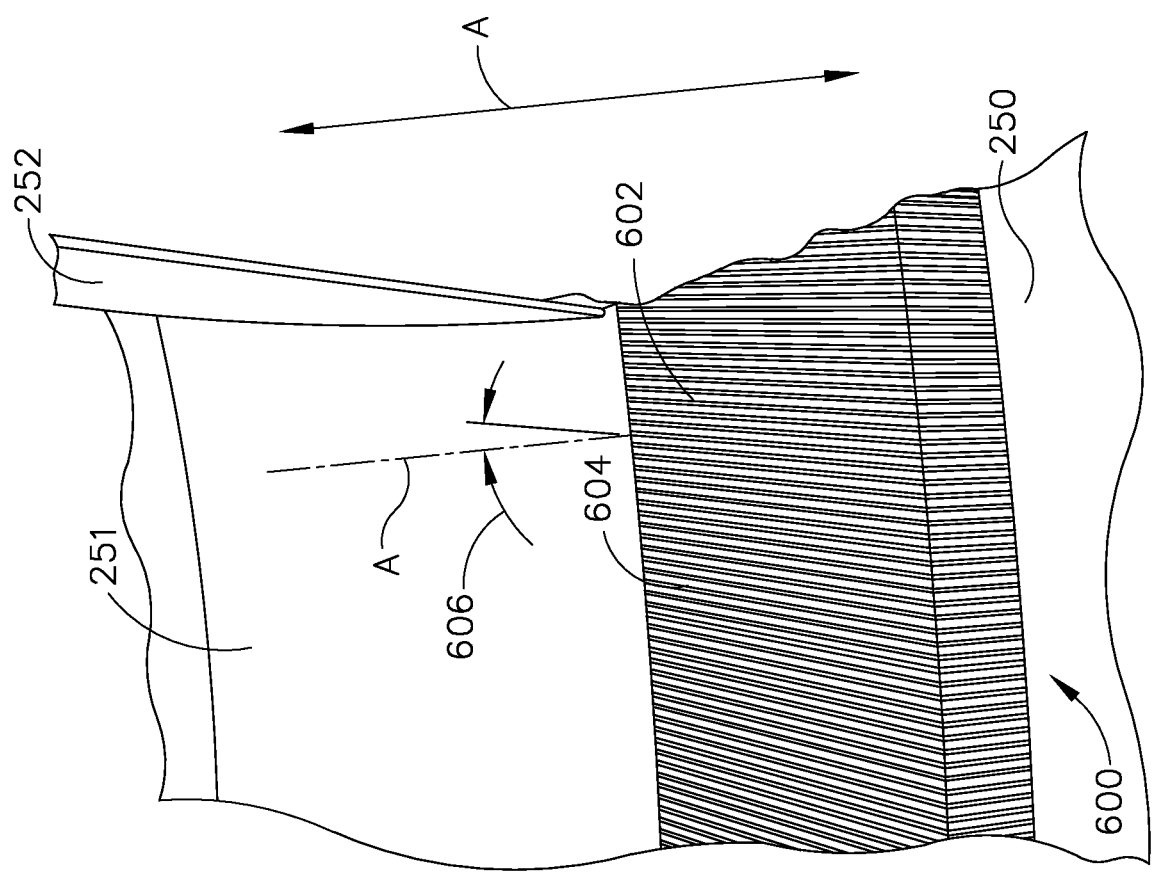

FIG. 4 is a perspective view of a surface cooler 400 disposed on inner radial surface 251 of nacelle 250. FIG. 5 is a perspective view of a surface cooler 500 disposed on inner radial surface 251 of nacelle 250. FIG. 6 is a perspective view of a surface cooler 600 disposed on inner radial surface 251 of nacelle 250. Surface coolers 400, 500, and 600 are each positioned axially aft of outlet guide vanes 252. Surface coolers 400, 500, and 600 each include a plurality of fins 402, 502, and 602 respectively disposed on an external surface 404, 504, and 604 of surface coolers 400, 500, and 600. Each fin of the plurality of fins 502 and 602 are oriented in an angle of orientation 506 and 606 with respect to axial direction A. Plurality of fins 402 align with axial direction A and direct first portion of air 262 (shown in FIG. 2) in axial direction A. Plurality of fins 502 are configured at a zero (0) to negative thirty (−30) degree angle of orientation 506 with respect to axial direction A. Plurality of fins 602 are configured at a zero (0) to positive thirty (+30) degree angle of orientation 606 with respect to axial direction A.

Changing the angle of orientation 406, 506, and 606 of plurality of fins 402, 502, and 602 permits plurality of fins 402, 502, and 602 to direct portion of air 262 in directions other than the axial direction A. Outlet guide vanes 252 directs first portion of air 262 in directions other than axial direction A to straighten the flow of first portion of air 262. Plurality of fins 402, 502, and 602 may be oriented to direct first portion of air 262 in the same direction as the outlet guide vanes 252 direct first portion of air 262. Directing air flow in the same direction as the outlet guide vanes 252 reduces pressure loss and drag and increases the fuel efficiency of gas turbine engine 120.

Figure 7:
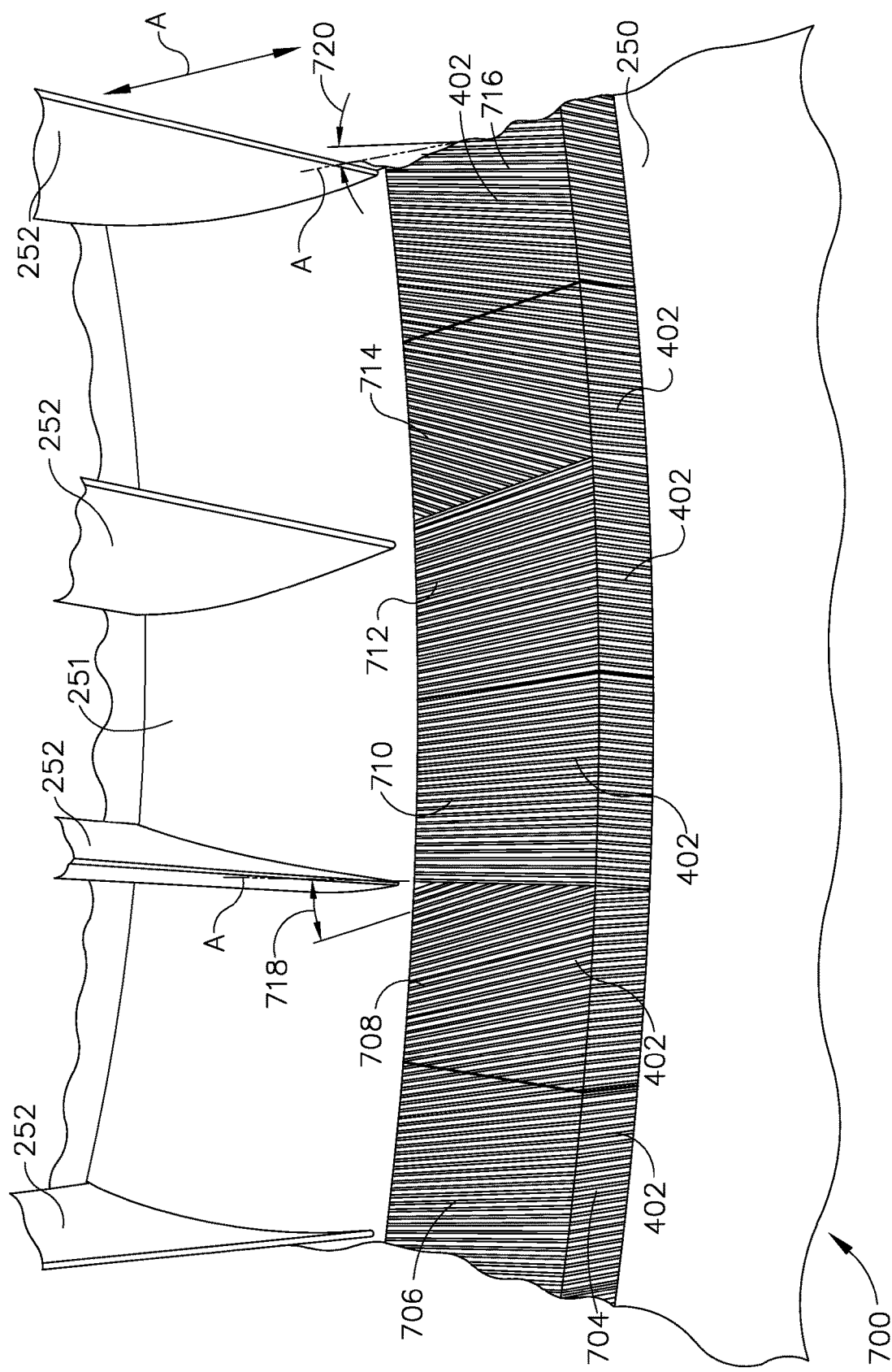

FIG. 7 is a perspective view of a surface cooler 700 disposed on inner radial surface 251 of nacelle 250. Surface cooler 700 is positioned axially aft of outlet guide vanes 252. Surface cooler 700 includes a plurality of fins 702 disposed on an external surface 704 of surface cooler 700. External surface 704 of surface cooler 700 is divided into a plurality of regions 706, 708, 710, 712, 714, and 716. Each fin of the plurality of fins 702 within regions 706, 708, 714, and 716 are oriented in an angle of orientation 718 and 720 with respect to axial direction A. In the exemplary embodiment, plurality of fins 702 within regions 710 and 712 align with axial direction A and direct first portion of air 262 (shown in FIG. 2) in axial direction A. Plurality of fins 702 within region 706 and 708 are configured at a zero (0) to negative thirty (−30) degree angle of orientation 718 with respect to axial direction A. Additionally, plurality of fins 702 within regions 714, and 716 are configured at a zero (0) to positive thirty (+30) degree angle of orientation 720 with respect to axial direction A.

Changing the angles of orientation 718 and 720 of plurality of fins 702 permits the plurality of fins 702 to direct portion of air 262 in directions other than the axial direction A. In the exemplary embodiment, outlet guide vanes 252 directs first portion of air 262 in directions other than axial direction A to straighten the flow of first portion of air 262. Plurality of fins 702 within regions 706, 708, 714, and 716 may be oriented to direct first portion of air 262 in the same direction as the outlet guide vanes 252 direct first portion of air 262. Directing air flow in the same direction as the outlet guide vanes 252 reduces pressure loss and drag and increases the fuel efficiency of gas turbine engine 120. Each region of the plurality of regions 706, 708, 710, 712, 714, and 716 may direct air in the same direction as other regions or may direct air in a different direction.

The above-described heat exchange assemblies provide an efficient method for cooling oil in a gas turbine engine. Specifically, the above-described heat exchange assembly directs air flow in the fan bypass duct in the same direction outlet guide vanes direct air flow in the fan bypass duct. Directing air flow in the same direction as the outlet guide vanes reduces pressure loss and drag. As such, reducing pressure loss within the fan bypass duct increases the fuel efficiency of the gas turbine engine.

Exemplary embodiments of the heat exchanger assembly are described above in detail. The heat exchanger assembly, and methods of operating such systems and devices are not limited to the specific embodiments described herein, but rather, components of systems and/or steps of the methods may be utilized independently and separately from other components and/or steps described herein. For example, the methods may also be used in combination with other systems requiring oil cooling, and are not limited to practice with only the systems and methods as described herein. Rather, the exemplary embodiment can be implemented and utilized in connection with many other machinery applications that are currently configured to receive and accept heat exchanger assemblies.

Example methods and apparatus for cooling oil with air are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat exchanger assembly comprising:
   a first conduit comprising a first inlet, a first outlet, and a first internal flow path extending therebetween, the first conduit configured to channel a flow of fluid to be cooled from the first inlet to the first outlet; and
   an external surface comprising a plurality of circumferentially adjacent regions, the plurality of circumferentially adjacent regions comprising a first region circumferentially adjacent to a second region, the first region comprising a first plurality of rows of fins extending away from the external surface, respective ones of the first plurality of rows of fins being circumferentially adjacent to one another and oriented in a first direction, the second region comprising a second plurality of rows of fins extending away from the external surface, respective ones of the second plurality of rows of fins being circumferentially adjacent to one another and oriented in a second direction, the second direction differing from the first direction;
   wherein the heat exchanger assembly is configured for installation in a bypass airflow passage of a turbofan engine, the heat exchanger assembly configured to be positioned axially aft of a plurality of outlet guide vanes circumferentially spaced in the bypass airflow passage, and wherein the external surface is configured to receive a flow of a coolant comprising bypass aft in heat transfer communication with the external surface, and
   wherein the first direction is selected based at least in part on an orientation of a first outlet guide vane from among the plurality of outlet guide vanes such that the first plurality of rows of fins are configured to direct a first portion of air in the bypass airflow passage to flow in a direction coinciding with the first outlet guide vane, and the second direction is selected based at least in part on an orientation of a second outlet guide vane from among the plurality of outlet guide vanes such that the second plurality of rows of fins are configured to direct a second portion of air in the bypass airflow passage to flow in a direction coinciding with the second outlet guide vane.

2. The heat exchanger assembly of claim 1, wherein the first direction and the second direction differ from one another by an angle, the angle being from 0 to 60 degrees.

3. The heat exchanger assembly of claim 1, wherein the first direction includes values in a range from 0 to 30 degrees relative to an axial direction of the heat exchanger assembly, and/or the second direction includes values in a range from −30 to 0 degrees relative to the axial direction of the heat exchanger assembly.

4. The heat exchanger assembly of claim 3, wherein the first plurality of rows of fins are oriented in the axial direction and the second plurality of rows of fins are oriented in a direction that differs from the axial direction.

5. A gas turbine engine comprising:
   a core engine comprising a heat exchanger assembly comprising:
   a first conduit comprising a first inlet, a first outlet, and a first internal flow path extending therebetween, the first conduit configured to channel a flow of fluid to be cooled from the first inlet to the first outlet;
   an external surface comprising a plurality of circumferentially adjacent regions, the plurality of circumferentially adjacent regions comprising a first region circumferentially adjacent to a second region, the first region comprising a first plurality of rows of fins extending away from the external surface, respective ones of the first plurality of rows of fins being circumferentially adjacent to one another and oriented in a first direction, the second region comprising a second plurality of rows of fins extending away from the external surface, respective ones of the second plurality of rows of fins being circumferentially adjacent to one another and oriented in a second direction, the second direction differing from the first direction;
   a bypass duct at least partially surrounding the core engine; and
   a plurality of airfoil members extending between the bypass duct and the core engine,
   wherein the heat exchanger assembly is configured for installation in the bypass duct, the heat exchanger assembly configured to be positioned axially aft of a plurality of outlet guide vanes circumferentially spaced in the bypass duct, and wherein the external surface is configured to receive a flow of a coolant comprising bypass air in heat transfer communication with the external surface, and
   wherein the first direction is selected based at least in part on an orientation of a first outlet guide vane from among the plurality of outlet guide vanes such that the first plurality of rows of fins are configured to direct a first portion of air in the bypass duct to flow in a direction coinciding with the first outlet guide vane, and the second direction is selected based at least in part on an orientation of a second outlet guide vane from among the plurality of outlet guide vanes such that the second plurality of rows of fins are configured to direct a second portion of air in the bypass duct to flow in a direction coinciding with the second outlet guide vane.

6. The gas turbine engine of claim 5, wherein the first direction and the second direction differ from one another by an angle, the angle being from 0 to 60 degrees.

7. The gas turbine engine of claim 5, wherein the first direction includes values in a range from 0 to 30 degrees relative to an axial direction of the gas turbine engine, and/or the second direction includes values in a range from −30 to 0 degrees relative to the axial direction of the gas turbine engine.

8. The gas turbine engine of claim 7, wherein the first plurality of rows of fins are oriented in the axial direction and the second plurality of rows of fins are oriented in a direction that differs from the axial direction.

9. A gas turbine engine assembly configured to drive a bladed rotatable member, the gas turbine engine assembly comprising:
a core engine comprising a high pressure compressor, a combustor, and a high pressure turbine in a serial flow arrangement, the core engine further comprising a heat exchanger assembly comprising:
a first conduit comprising a first inlet, a first outlet, and a first internal flow path extending therebetween, the first conduit configured to channel a flow of fluid to be cooled from the first inlet to the first outlet;
an external surface comprising a plurality of regions, the plurality of regions comprising a first region and a second region, the first region comprising a first plurality of rows of fins extending away from the external surface, respective ones of the first plurality of rows of fins being circumferentially adjacent to one another and oriented in a first direction, the second region comprising a second plurality of rows of fins extending away from the external surface, respective ones of the second plurality of rows of fins being circumferentially adjacent to one another and oriented in a second direction, the second direction differing from the first direction;
a bypass duct at least partially surrounding the core engine; and
a plurality of airfoil members extending between the bypass duct and the core engine,
wherein the heat exchanger assembly is configured for installation in the bypass duct, the heat exchanger assembly configured to be positioned axially aft of a plurality of outlet guide vanes circumferentially spaced in the bypass duct, and wherein the external surface is configured to receive a flow of a coolant in heat transfer communication with the external surface, and
wherein the first direction is selected based at least in part on an orientation of a first outlet guide vane from among the plurality of outlet guide vanes such that the first plurality of rows of fins are configured to direct a first portion of air in the bypass duct to flow in a direction coinciding with the first outlet guide vane, and the second direction is selected based at least in part on an orientation of a second outlet guide vane from among the plurality of outlet guide vanes such that the second plurality of rows of fins are configured to direct a second portion of air in the bypass duct to flow in a direction coinciding with the second outlet guide vane.

10. The gas turbine engine assembly of claim 9, wherein the first direction and the second direction differ from one another by an angle, the angle being from 0 to 60 degrees.

11. The gas turbine engine assembly of claim 9, wherein the first direction includes values in a range from 0 to 30 degrees relative to an axial direction of the core engine, and/or the second direction includes values in a range from −30 to 0 degrees relative to the axial direction of the core engine.

12. The gas turbine engine assembly of claim 11, wherein the first plurality of rows of fins are oriented in the axial direction and the second plurality of rows of fins are oriented in a direction that differs from the axial direction.

* * * * *